(12) United States Patent
Zhao et al.

(10) Patent No.: US 9,504,916 B2
(45) Date of Patent: Nov. 29, 2016

(54) ONLINE GAME ANTI-CHEATING METHOD AND SERVER

(71) Applicant: TENCENT TECHNOLOGY (SHENZHEN) COMPANY LIMITED, Shenzhen (CN)

(72) Inventors: Zhaojie Zhao, Shenzhen (CN); Ronghui Yang, Shenzhen (CN); Dexin Su, Shenzhen (CN); Shengli Zhang, Shenzhen (CN); Xing Zeng, Shenzhen (CN); Dong Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 331 days.

(21) Appl. No.: 14/201,867

(22) Filed: Mar. 9, 2014

(65) Prior Publication Data
US 2014/0287826 A1    Sep. 25, 2014

Related U.S. Application Data

(63) Continuation of application No. PCT/CN2013/088179, filed on Dec. 29, 2013.

(30) Foreign Application Priority Data

Mar. 25, 2013   (CN) .......................... 2013 1 0097233

(51) Int. Cl.
*A63F 9/24*  (2006.01)
*A63F 13/35* (2014.01)
*A63F 13/75* (2014.01)
*A63F 13/77* (2014.01)

(52) U.S. Cl.
CPC ............... *A63F 13/35* (2014.09); *A63F 13/75* (2014.09); *A63F 13/77* (2014.09)

(58) Field of Classification Search
None
See application file for complete search history.

(56) References Cited

U.S. PATENT DOCUMENTS

| 7,567,795 | B1* | 7/2009 | Champion | H04W 8/22 455/410 |
|---|---|---|---|---|
| 2005/0288080 | A1 | 12/2005 | Lockton et al. | |
| 2006/0239430 | A1* | 10/2006 | Gue | G06Q 30/06 379/201.05 |

(Continued)

FOREIGN PATENT DOCUMENTS

| CN | 101114324 A | 1/2008 |
|---|---|---|
| CN | 201134104 Y | 10/2008 |

(Continued)

OTHER PUBLICATIONS

The World Intellectual Property Organization (WIPO) International Search Report for PCT/CN2013/088179 Mar. 13, 2014.

(Continued)

*Primary Examiner* — Paul A D'Agostino
(74) *Attorney, Agent, or Firm* — Anova Law Group, PLLC (57) ABSTRACT

An online game anti-cheating method is provided. The method includes sending cheating program characteristics to a client and receiving characteristics matching with cheating program characteristics reported by the client. The method also includes matching the reported characteristics with characteristics in at least one stored characteristic list and obtaining a determination result based on a matching result. Further, the method includes returning the determination result to the client and to cause the client to react to the determination result.

14 Claims, 6 Drawing Sheets

(56) References Cited

U.S. PATENT DOCUMENTS

| | | | | |
|---|---|---|---|---|
| 2007/0238528 | A1* | 10/2007 | Harris | A63F 13/12 463/42 |
| 2008/0004107 | A1* | 1/2008 | Nguyen | G06Q 10/10 463/29 |
| 2008/0032800 | A1* | 2/2008 | Liu | G07F 17/32 463/42 |
| 2008/0147854 | A1* | 6/2008 | Van Datta | A63F 13/12 709/224 |
| 2009/0055193 | A1* | 2/2009 | Maislos | G06F 21/32 704/273 |
| 2009/0069088 | A1* | 3/2009 | Levitt | G07F 17/3241 463/42 |
| 2009/0227367 | A1* | 9/2009 | Schneier | A63F 13/12 463/29 |
| 2010/0035694 | A1* | 2/2010 | Losica | G07F 17/32 463/42 |
| 2010/0180344 | A1* | 7/2010 | Malyshev | G06F 21/566 726/23 |
| 2011/0269547 | A1* | 11/2011 | Harris | A63F 13/12 463/42 |
| 2011/0281655 | A1* | 11/2011 | Nguyen | G07F 17/32 463/42 |
| 2011/0282778 | A1* | 11/2011 | Wright | G06Q 20/04 705/38 |
| 2012/0022902 | A1* | 1/2012 | Gressel | G06Q 10/02 705/5 |
| 2012/0185948 | A1* | 7/2012 | Merkle, Jr. | G06F 21/10 726/26 |
| 2012/0246725 | A1* | 9/2012 | Osipkov | G06F 21/572 726/23 |
| 2012/0296692 | A1* | 11/2012 | O'Malley | G06Q 10/0635 705/7.28 |
| 2013/0123011 | A1* | 5/2013 | Nguyen | G06Q 10/10 463/31 |
| 2013/0318605 | A1* | 11/2013 | Crume | H04L 63/1483 726/23 |
| 2014/0096184 | A1* | 4/2014 | Zaitsev | G06F 21/56 726/1 |
| 2014/0109223 | A1* | 4/2014 | Jin | H04L 63/1408 726/23 |
| 2014/0123280 | A1* | 5/2014 | Kedma | G06F 21/56 726/23 |
| 2014/0130158 | A1* | 5/2014 | Wang | G06F 21/566 726/23 |
| 2014/0184803 | A1* | 7/2014 | Chu | G06T 7/2093 348/159 |
| 2015/0237596 | A1* | 8/2015 | Carlsson | H04W 64/006 455/456.1 |

FOREIGN PATENT DOCUMENTS

| | | |
|---|---|---|
| CN | 102158367 A | 8/2011 |
| KR | 20090001628 A | 1/2009 |

OTHER PUBLICATIONS

The State Intellectual Property Office of the People's Republic of China (SIPO) Office Action 1 for 201310097233.3 Feb. 25, 2015.
The State Intellectual Property Office of the People's Republic of China (SIPO) Office Action 2 for 201310097233.3 Jun. 30, 2015.

* cited by examiner

ONLINE GAME ANTI-CHEATING METHOD AND SERVER

CROSS-REFERENCES TO RELATED APPLICATIONS

This application is a continuation application of PCT Patent Application No. PCT/CN2013/088179, filed on Dec. 29, 2013, which claims priority of Chinese Patent Application No. 201310097233.3, filed on Mar. 25, 2013, the entire contents of which are incorporated by reference herein.

FIELD OF THE INVENTION

The present invention generally relates to computer technologies and, more particularly, to an online game anti-cheating method and server.

BACKGROUND

With the popularization of online games, cheating programs are now more common and updated more frequently than ever before. A cheating program is designed to help a player skip some tough or tedious steps in an online game to accumulate more experience points. In order to timely and effectively prevent cheating programs, cheating program characteristics are released frequently. As a result, wrong characteristics of cheating programs are sometimes released. Therefore, a normal player may be punished mistakenly, ultimately affecting the game's reputation.

Currently, the anti-cheating strategy is: a server sends cheating program characteristics to a client; the client detects its own game environment using these cheating program characteristics. If it is detected that there are matched cheating program characteristics, a pop-up window is displayed and the current player is kicked out of the game or the game is terminated.

For example, there is a cheating program named "dynasty" in the Dungeon & Fighter online game. All monsters will be killed immediately if this cheating program is turned on in the game. Also, the cheating program can accelerate the online gaming experience. Through analyzing the binary code of the cheating program and extracting its characteristics, when it is detected there is binary characteristics in the player's game environment, the client indicates that the player has turned on the cheating program "dynasty". The client may then kick the current player out of the game or terminate the game.

However, during implementation of the anti-cheating strategy, if the extracted cheating program characteristics are wrong, the client may punish the player mistakenly. Therefore, the security of the anti-cheating method may be poor, ultimately affecting the player's experience.

The disclosed method and server are directed to solve one or more problems set forth above and other problems.

BRIEF SUMMARY OF THE DISCLOSURE

One aspect of the present disclosure includes an online game anti-cheating method. The method includes sending cheating program characteristics to a client and receiving characteristics matching with cheating program characteristics reported by the client. The method also includes matching the reported characteristics with characteristics in at least one stored characteristic list and obtaining a determination result based on a matching result. Further, the method includes returning the determination result to the client and to cause the client to react to the determination result.

Another aspect of the present disclosure includes an online game anti-cheating sever. The server includes a sending unit configured to send cheating program characteristics to a client and a receiving unit configured to receive characteristics matching with cheating program characteristics reported by the client. The server also includes a storage unit configured to store at least one characteristic list and a determination unit configured to match the reported characteristics with characteristics in the at least one stored characteristic list stored in the storage unit and obtain a determination result based on a matching result. Further, the server includes the sending unit further configured to return the determination result to the client and to cause the client to react to the determination result.

Other aspects of the present disclosure can be understood by those skilled in the art in light of the description, the claims, and the drawings of the present disclosure.

BRIEF DESCRIPTION OF THE DRAWINGS

In order to more clearly illustrate technical solutions of the present invention, the figures which are needed to be used in the description of the present invention or the existing technology are briefly described in the following. Obviously, the figures in the following description are only some embodiments of the present invention, and it is easily for those skilled in the art to obtain other figures based on the following figures without creative work.

DETAILED DESCRIPTION

Reference will now be made in detail to exemplary embodiments of the disclosure, which are illustrated in the accompanying drawings.

Figure 8:
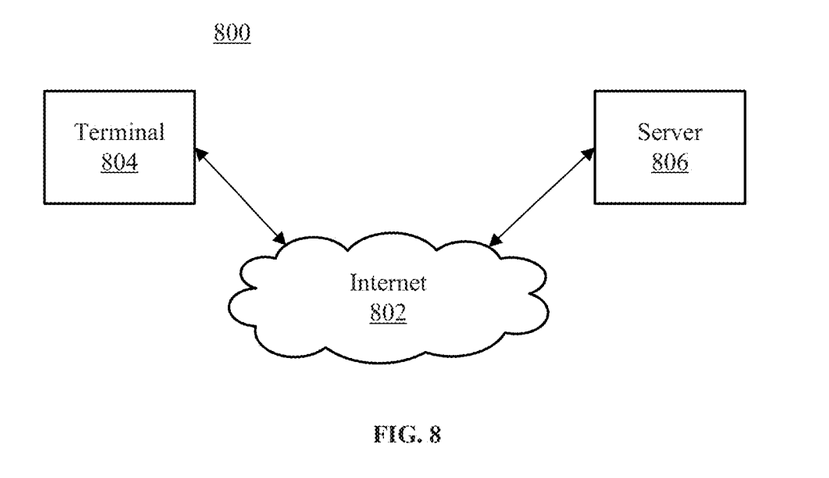
FIG. 8 shows an environment incorporating certain aspects of the present invention.

FIG. 8 shows an environment incorporating certain aspects of the present invention. As shown in FIG. 8, environment 800 may include a terminal 804, a server 806, and the Internet 802. The terminal 804 may access the server 806 through the Internet 802 for certain personalized services provided by the server 806. Although only one server 806 and one terminal 804 is shown in the environment 800, any number of terminals 804 or servers 806 may be included, and other devices may also be included.

The Internet 802 may include any appropriate type of communication network for providing network connections to the terminal 804 and server 806 or among multiple terminals 804 and servers 806. For example, Internet 802 may include the Internet or other types of computer networks or telecommunication networks, either wired or wireless.

A terminal, as used herein, may refer to any appropriate user terminal with certain computing capabilities, such as a personal computer (PC), a work station computer, a server computer, a hand-held computing device (tablet), a smart phone or mobile phone, or any other user-side computing device. In certain embodiments, terminal 804 may be a wireless terminal, such as a smart phone, a tablet computer, or a mobile phone, etc. Terminal 804 may be implemented on any appropriate computing platform.

A server, as used herein, may refer one or more server computers configured to provide certain web server functionalities to provide certain online gaming services, which may match characteristics reported by the client with characteristics in a stored characteristic list and obtain a determination result based on a matching result. A server may also include one or more processors to execute computer programs in parallel.

Figure 1:
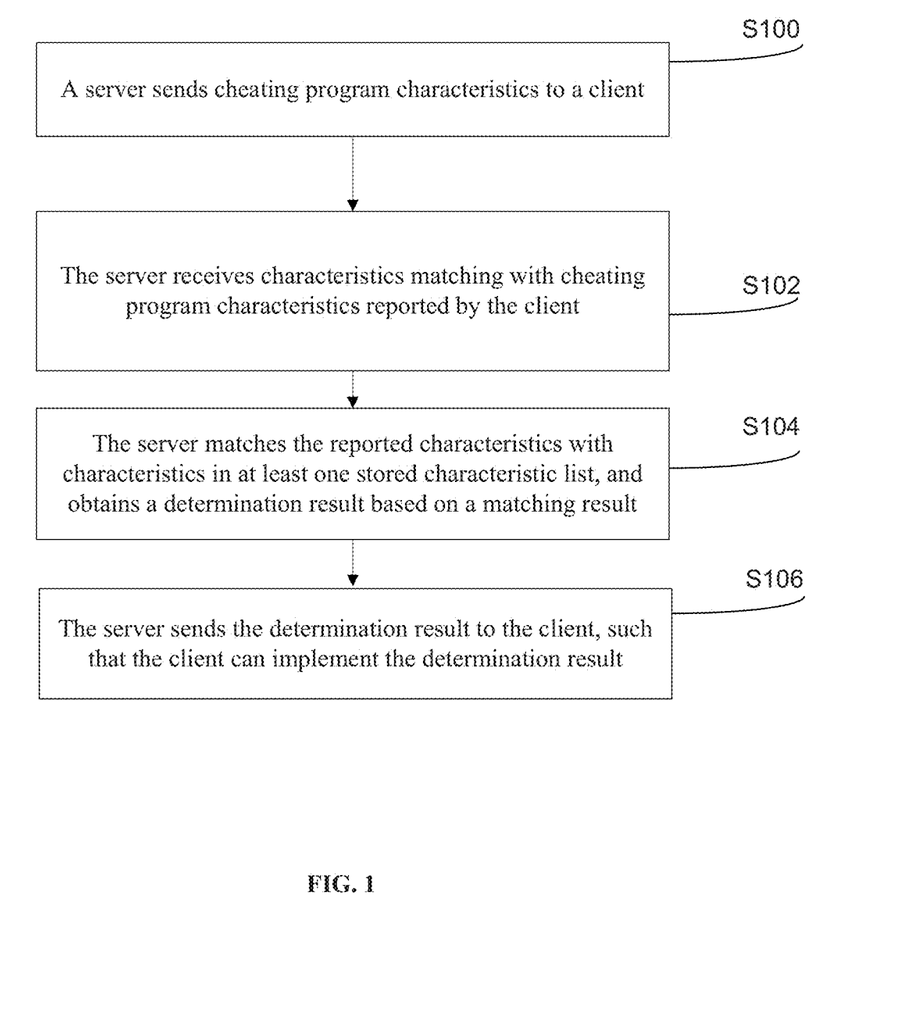
FIG. 1 illustrates an overall flow chart of an exemplary anti-cheating method consistent with the disclosed embodiments.

FIG. 1 illustrates an overall flow chart of an exemplary anti-cheating method consistent with the disclosed embodiments. A user can install game software on a mobile terminal. When the user wants to play the game, the user logins into a server that has the game installed on and plays the game with other players. As used herein, the mobile terminal that has game software installed on can be called a client, or the client may also refer to the game software. The mobile terminal may be a mobile phone, a personal computer, and a tablet. For ease of understanding, a server may be the main execution component in certain embodiments. As shown in FIG. 1, the online game control process may include the following steps.

S100: a server sends cheating program characteristics to a client. The server may in real-time update cheating program characteristics and sends updated cheating program characteristics to the client. The client may then match the cheating program characteristics with programs running on the client.

S102: the server receives characteristics matching with cheating program characteristics reported by the client. After the client receives the cheating program characteristics from the server, the client in real-time scans and detects the current game environment. The client detects whether there is a cheating program running on the client, that is, the client detects whether there are characteristics matching between any program and the cheating program characteristics sent from the server. If there are characteristics matching with the cheating program characteristics, the client reports the matched characteristics to the server. Then, the server determines the reported characteristics.

S104: the server matches the reported characteristics with characteristics in at least one stored characteristic list, and obtains a determination result based on a matching result.

The server stores a real-time updated characteristic list. The characteristic list includes an abnormal characteristic list and a safe characteristic list. The abnormal characteristic list refers to a list containing characteristics that have been mistakenly considered as the cheating program characteristics. That is, the characteristics in the abnormal characteristic list can be mistakenly considered as the cheating program characteristics by the client. The corresponding punishment operations are not needed if the abnormal characteristics are detected. The safe characteristic list refers to a list containing the cheating program characteristics. The corresponding punishment operations need to be performed if the safe characteristics are detected.

Further, if the reported characteristics match with the characteristics in the abnormal characteristic list, that is, the reported characteristics are included in the abnormal characteristic list, the server determines not to punish the player.

If the reported characteristics do not match with the characteristics in the abnormal characteristic list, but the reported characteristics match with the characteristics in the safe characteristic list. That is, the reported characteristics are included in the safe characteristic list, the server determines to punish the player. That is, the client needs to kick the current player out the game, or terminate the current player's game playing.

If the reported characteristics do not match with either the characteristics in the abnormal characteristic list or the characteristics in the safe characteristic list, the server may determine to delay the determination. The characteristic list is updated within a predetermined counting time period based on the number of times that the characteristics are reported. The server then matches the reported characteristics with the updated characteristic list, and obtains the determination result.

S106: the server sends the determination result to the client, such that the client can implement the determination result.

In certain embodiments, when the determination result is not to punish the current player, the client may keep the current player's game playing. On the other hand, when the determination result is to punish the current player, the client kicks the current player out of the game (i.e., force the current player being logged out of the game), or terminates the current player's game playing. Further, when the determination result is to delay the determination, the client reports the characteristics to the server again in the predetermined waiting time period, and the server can re-determine the result.

Therefore, an anti-cheating method is provided in the present disclosure. A server receives characteristics matching with cheating program characteristics reported by a client. The server matches the reported characteristics with characteristics in at least one stored characteristic list. Based on a matching result, the server obtains a determination result. The corresponding punishment operation is not performed just because the client detects that the characteristics that match the cheating program characteristics are detected. Instead, the server can further determine the characteristics matching with cheating program characteristics reported by the client, thereby improving the security of cheating program detection. In addition, the determination result is obtained by the server, reducing the number of wrong determinations caused by no real-time updated cheating program characteristics on the client. The method further enhances security and reduces risk, ultimately improving the user's experience.

Figure 2:
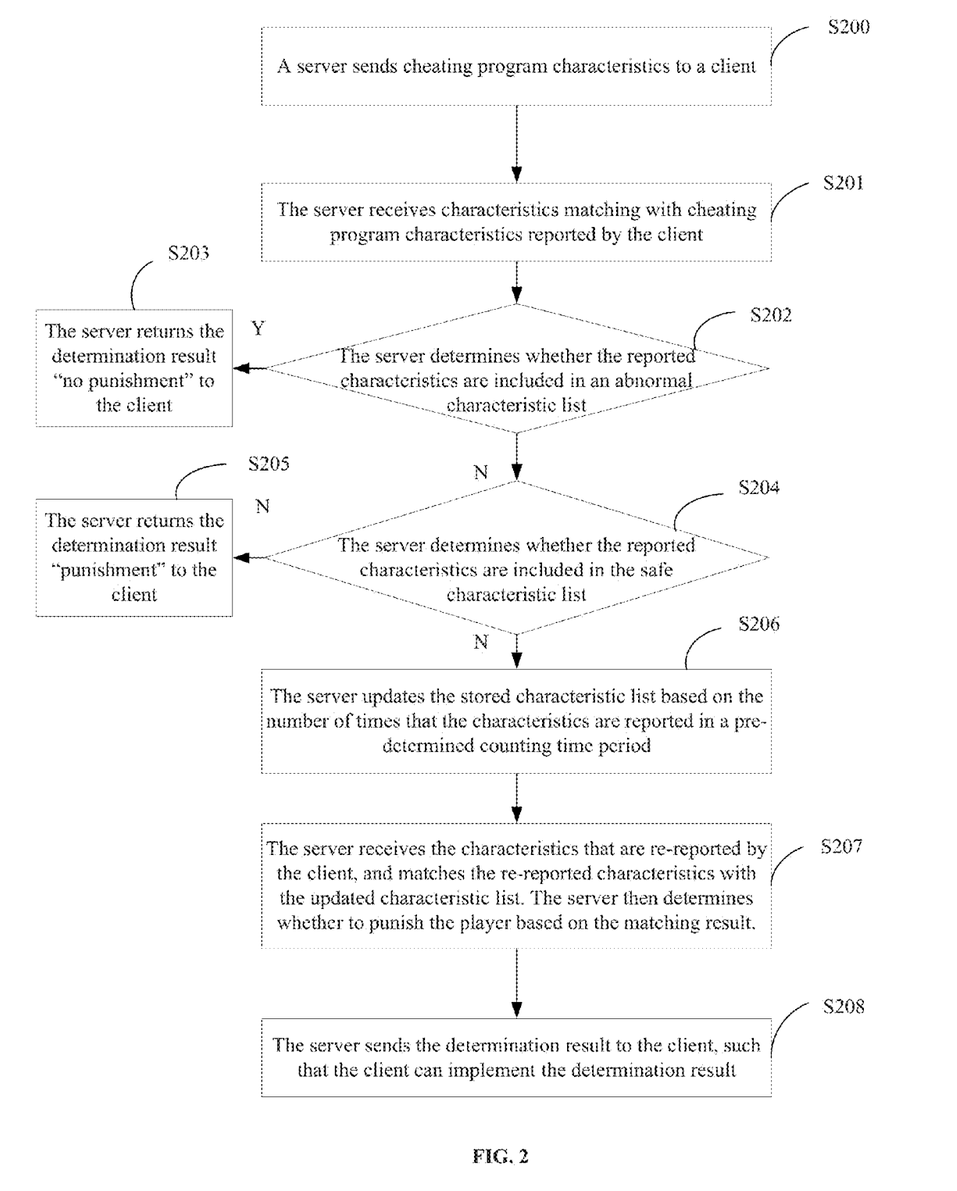
FIG. 2 illustrates a detailed flow chart of an exemplary anti-cheating method consistent with the disclosed embodiments.

FIG. 2 illustrates a detailed flow chart of an exemplary anti-cheating method consistent with the disclosed embodiments. As shown in FIG. 2, the online game control process may include the following steps.

S200: a server sends cheating program characteristics to a client. The server may in real-time update the cheating program characteristics and send the updated cheating program characteristics to the client. The client may then match the cheating program characteristics with programs running on the client.

S201: the server receives characteristics matching with cheating program characteristics reported by the client. After the client receives the cheating program characteristics from the server, the client real-time scans and detects the current game environment. The client detects whether there is a cheating program running on the client. That is, the client detects whether there are characteristics matching between any program and the cheating program characteristics sent from the server. If there are characteristics matching with the cheating program characteristics, the client reports the matched characteristics to the server. Then the server determines the reported characteristics.

S202: the server determines whether the reported characteristics are included in an abnormal characteristic list.

The abnormal characteristic list refers to a list containing characteristics that have been mistakenly considered as the cheating program characteristics. That is, the characteristics in the abnormal characteristic list can be mistakenly considered as the cheating program characteristics by the client. The corresponding punishment operations are not needed if the abnormal characteristics are detected. A safe characteristic list refers to a list containing the cheating program characteristics. The corresponding punishment operations need to be performed when the safe characteristics are detected.

If the reported characteristics match with characteristics in the abnormal characteristic list, that is, the reported characteristics are included in the abnormal characteristic list, the determination result is not to punish the current player ("no punishment"). The process goes to S203.

If the reported characteristics do not match with characteristics in the abnormal characteristic list, the process goes to S204.

S203: the server returns the determination result "no punishment" to the client.

S204: the server determines whether the reported characteristics are included in the safe characteristic list.

If the reported characteristics match with characteristics in the safe characteristic list, that is, the reported characteristics are included in the safe characteristic list, the server determines to punish the player ("punishment"). That is, the client needs to kick the current player out of the game (i.e., force the current player being logged out of the game), or terminate the current player's game playing. The process goes to S205.

If the reported characteristics do not match with characteristics in the safe characteristic list, that is, the reported characteristics are not included in the safe characteristic list, the process goes to S206.

S205: the server returns the determination result "punishment" to the client.

S206: the server updates the stored characteristic list based on the number of times that the characteristics are reported in a predetermined counting time period.

In certain embodiments, in the predetermined counting time period, the server counts the number of times that the same characteristics are reported from multiple clients. That is, the server counts the number of times that the characteristics are reported in S204. When the number of times that the characteristics are reported is greater than a preset threshold value, the server determines that the reported characteristics are abnormal characteristics and adds the reported characteristics into the abnormal characteristic list. When the number of times that the characteristics are reported is not greater than the preset threshold value, the server determines that the reported characteristics are safe characteristics and adds the reported characteristics into the safe characteristic list.

S207: the server receives the characteristics that are re-reported by the client, and matches the re-reported characteristics with the updated characteristic list. The server then determines whether to punish the player based on the matching result.

Further, if the characteristics re-reported by the client match with characteristics in the abnormal characteristic list, that is, the characteristics re-reported by the client are included in the abnormal characteristic list, the server determines not to punish the player.

If the characteristics re-reported by the client do not match with characteristics in the abnormal characteristic list, but match with characteristics in the safe characteristic list, that is, the characteristics re-reported by the client are included in the safe characteristic list, the server determines to punish the current player. The client needs to kick the current player out of the game (i.e., force the current player being logged out of the game), or terminate the current game playing.

The characteristics are determined by the server for multiple times. Therefore, the server can further determine whether the characteristics are cheating program characteristics.

S208: the server returns the determination result to the client, such that the client can implement the determination result.

An anti-cheating method is provided in the present disclosure. A server receives characteristics matching with cheating program characteristics reported by a client. The server matches the reported characteristics with characteristics in at least one stored characteristic list. Based on a matching result, the server obtains a determination result. The corresponding punishment operation is not performed just because the characteristics that match the cheating program characteristics are detected. Instead, the server can further determine the characteristics matching with cheating program characteristics reported by the client, thereby improving the security of cheating program detection. In addition, the determination result is obtained by the server, reducing the number of wrong determinations caused by no real-time updated cheating program characteristics on the client. The method further enhances security and reduces risk, ultimately improving the user's experience.

Figure 3:
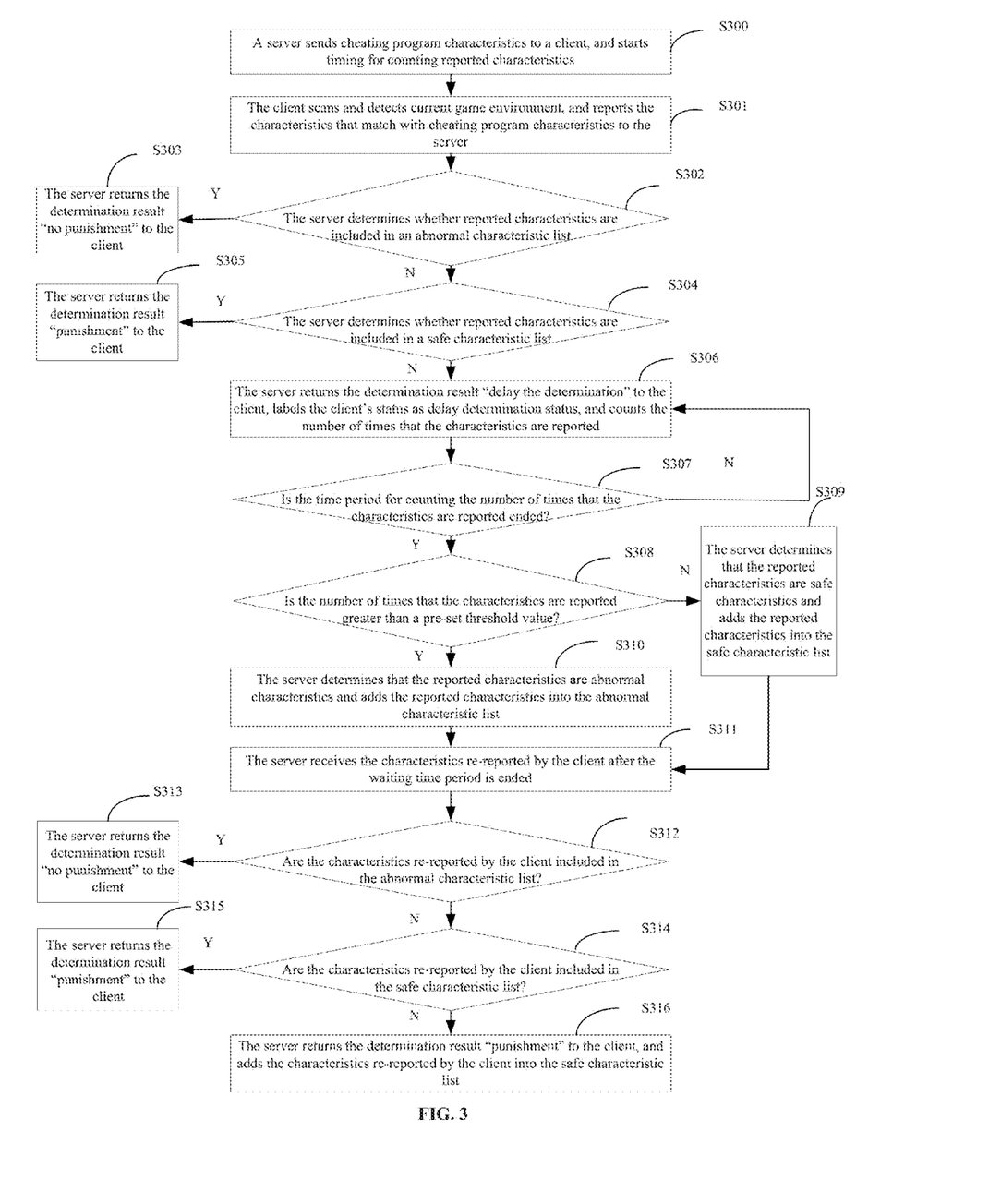
FIG. 3 illustrates a detailed flow chart of another exemplary anti-cheating method consistent with the disclosed embodiments.

FIG. 3 illustrates a detailed flow chart of another exemplary anti-cheating method consistent with the disclosed embodiments. As shown in FIG. 3, the online game control process may include the following steps.

S300: a server sends cheating program characteristics to a client, and starts timing for counting reported characteristics, where the time period for counting the reported characteristics is predetermined by the system and can be modified based on actual needs.

S301: the client in real-time scans and detects current game environment, and reports the characteristics that match with cheating program characteristics to the server.

S302: the server determines whether the reported characteristics are included in an abnormal characteristic list.

The abnormal characteristic list refers to a list containing characteristics that have been mistakenly considered as the cheating program characteristics. That is, the characteristics in the abnormal characteristic list can be mistakenly considered as the cheating program characteristics by the client. The corresponding punishment operations are not needed if abnormal characteristics are detected. A safe characteristic list refers to a list containing the cheating program characteristics. The corresponding punishment operations need to be performed when safe characteristics are detected.

If the reported characteristics match with characteristics in the abnormal characteristic list, that is, the reported characteristics are included in the abnormal characteristic list, the server determines not to punish the current player. The process goes to S303. If the reported characteristics do not match with characteristics in the abnormal characteristic list, the process goes to S304.

S303: the server returns the determination result "no punishment" to the client.

S304: the server determines whether the reported characteristics are included in the safe characteristic list.

If the reported characteristics match with characteristics in the safe characteristic list, that is, the reported characteristics are included in the safe characteristic list, the server determines to punish the current player. The client needs to kick the current player out of the game (i.e., force the current player being logged out of the game), or terminate the current player's game playing. The process then goes to S305.

On the other hand, if the reported characteristics do not match with characteristics in the safe characteristic list, that is, the reported characteristics are not included in the safe characteristic list, the process goes to S306.

S305: the server returns the determination result "punishment" to the client.

S306: the server returns a determination result "delay the determination" to the client, labels the client's status as a delay determination status, and counts the number of times that the characteristics are reported. In certain embodiments, the determination result "delay the determination" also includes the time period that the client needs to wait for delaying reporting. Further, the client can report the characteristics again after the waiting time period is ended.

S307: the server determines whether the time period for counting the number of times that the characteristics are reported is ended. If the time period for counting the number of times that the characteristics are reported is ended, the process goes to S308; otherwise, the process goes to S306.

S308: the server determines whether the number of times that the characteristics are reported is greater than a preset threshold value.

When the number of times that the characteristics are reported is greater than the preset threshold value, the process goes to S310. When the number of times that the characteristics are reported is not greater than the preset threshold value, the process goes to S309. The process then goes to S310.

S309: the server determines that the reported characteristics are safe characteristics and adds the reported characteristics into the safe characteristic list, thereby updating the safe characteristic list.

S310: the server determines that the reported characteristics are abnormal characteristics and adds the reported characteristics into the abnormal characteristic list, thereby updating the abnormal characteristic list.

S311: the server receives the characteristics re-reported by the client after the waiting time period is ended.

S312: The server determines whether the characteristics re-reported by the client are included in the abnormal characteristic list.

The abnormal characteristic list refers to a list containing characteristics that have been mistakenly considered as the cheating program characteristics. That is, the characteristics in the abnormal characteristic list can be mistakenly considered as the cheating program characteristics by the client. The corresponding punishment operations are not needed if abnormal characteristics are detected. A safe characteristic list refers to a list containing the cheating program characteristics. The corresponding punishment operations need to be performed when safe characteristics are detected.

If the characteristics re-reported by the client match with characteristics in the abnormal characteristic list, that is, the characteristics re-reported by the client are included in the abnormal characteristic list, the server determines not to punish the current player. The process goes to S313.

If the characteristics re-reported by the client do not match with characteristics in the abnormal characteristic list, the process goes to S314.

S313: the server returns the determination result "no punishment" to the client.

S314: the server determines whether the characteristics re-reported by the client are included in the safe characteristic list.

If the characteristics re-reported by the client match with characteristics in the safe characteristic list, that is, the characteristics re-reported by the client are included in the safe characteristic list, the server determines to punish the current player. The client needs to kick the current player out of the game (i.e., force the current player being logged out of the game), or terminate the current player's game playing. The process goes to S315.

If the characteristics re-reported by the client do not match with characteristics in the safe characteristic list, that is, the characteristics re-reported by the client are not included in the safe characteristic list, the process goes to S316.

S315: the server returns the determination result "punishment" to the client.

S316: the server returns the determination result "punishment" to the client, and adds the characteristics re-reported by the client into the safe characteristic list, thereby updating the safe characteristic list.

When the characteristics re-reported by the client are not included either in the safe characteristic list or in the abnormal characteristic list, the server determines that the characteristics re-reported by the client are safe characteristics, and adds those characteristics into the safe characteristic list.

Optionally, the process may also include the following steps.

The server detects whether there is a delay determination label on the client. If there is a delay determination label, according to S312 and S314, the server determines the client with a delay determination status. The server determines to punish or not to punish the player based on the final judgment result.

Therefore, an online game anti-cheating method is provided in the present disclosure. A server receives characteristics matching with cheating program characteristics reported by a client. The server matches the reported characteristics with characteristics in at least one stored characteristic list. Based on a matching result, the server obtains a determination result. The corresponding punishment operation is not performed just because the client detects that the characteristics that match the cheating program characteristics are detected. Instead, the server can further determine the characteristics matching with cheating program characteristics reported by the client, thereby improving the security of cheating program detection. In addition, the determination result is obtained by the server, reducing the number of wrong determinations caused by no real-time updated cheating program characteristics on the client. The method further enhances security and reduces risk, ultimately improving the user's experience.

Figure 4:
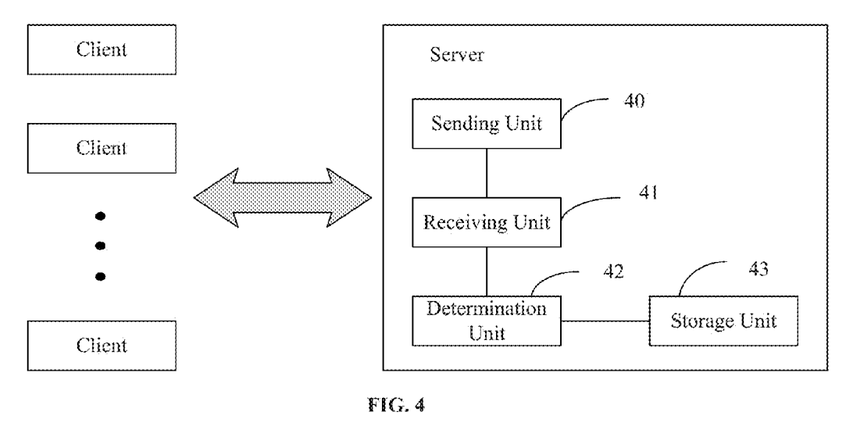
FIG. 4 illustrates an overall structure diagram of an exemplary anti-cheating server consistent with the disclosed embodiments.

FIG. 4 illustrates an overall structure diagram of an exemplary anti-cheating server consistent with the disclosed embodiments. As shown in FIG. 4, the server includes a sending unit 40, a receiving unit 41, a determination unit 42 and a storage unit 43.

The server can establish communication connections with multiple clients. The server may in real-time update cheating program characteristics and send updated cheating program characteristics to multiple clients.

The sending unit 40 is configured to send cheating program characteristics to a client. The receiving unit 41 is configured to receive characteristics matching with cheating program characteristics reported by the client. After the client receives the cheating program characteristics from the server, the client in real-time scans and detects current game environment. The client detects whether there is a cheating program running on the client, that is, the client detects whether there are characteristics matching between any program and cheating program characteristics sent from the server. If there are characteristics matching with cheating program characteristics, the client reports the matched characteristics to the server. Then, the server determines the reported characteristics.

The determination unit 42 is configured to match the characteristics received by the receiving unit 41 with the characteristics stored in the storage unit 43, and to obtain a determination result based on a matching result.

The storage unit 43 is configured to store a real-time updated characteristic list. The characteristic list includes an abnormal characteristic list and a safe characteristic list. The abnormal characteristic list refers to a list containing characteristics that have been mistakenly considered as the cheating program characteristics. That is, the characteristics in the abnormal characteristic list can be mistakenly considered as the cheating program characteristics by the client. The corresponding punishment operations are not needed if abnormal characteristics are detected. The safe characteristic list refers to a list containing the cheating program characteristics. The corresponding punishment operations need to be performed when safe characteristics are detected.

If the reported characteristics match with characteristics in the abnormal characteristic list, that is, the reported characteristics are included in the abnormal characteristic list, the determination unit 42 determines not to punish the current player.

If the reported characteristics match with characteristics in the safe characteristic list, that is, the reported characteristics are included in the safe characteristic list, the determination unit 42 determines to punish the current player. That is, the client needs to kick the current player out of the game (i.e., force the current player being logged out of the game), or terminate the current player's game playing.

If the reported characteristics do not match with either characteristics in the abnormal characteristic list or characteristics in the safe characteristic list, the determination unit 42 may determine to delay the determining result. In a predetermined counting time period, the characteristic list is updated based on the number of times that the characteristics are reported. The server then matches the re-reported characteristics with the updated characteristic list, and obtains the determination result. The determination unit 42 determines the re-reported characteristics based on the updated characteristic list.

The sending unit is further configured to send the determination result determined by the determination unit 42 to the client, such that the client can implement the determination result. When the determination result is not to punish the current player, the client may keep the current player's game playing. On the other hand, when the determination result is to punish the current player, the client kicks the current player out of the game (i.e., force the current player being logged out of the game), or terminates the current player's game playing. Further, when the determination result is to delay the determination result, the client reports the characteristics to the server again in the predetermined waiting time period, and the server can re-determine the result.

An online game anti-cheating method is provided in the present disclosure. A server receives characteristics matching with cheating program characteristics reported by a client. The server matches the reported characteristics with characteristics in at least one stored characteristic list. Based on a matching result, the server obtains a determination result. The corresponding punishment operation is not performed just because the client detects that the characteristics that match the cheating program characteristics are detected. Instead, the server can further determine the characteristics matching with cheating program characteristics reported by the client, thereby improving the security of cheating program detection. In addition, the determination result is obtained by the server, reducing the number of wrong determinations caused by no real-time updated cheating program characteristics on the client. The method further enhances security and reduces risk, ultimately improving the user's experience.

Figure 5:
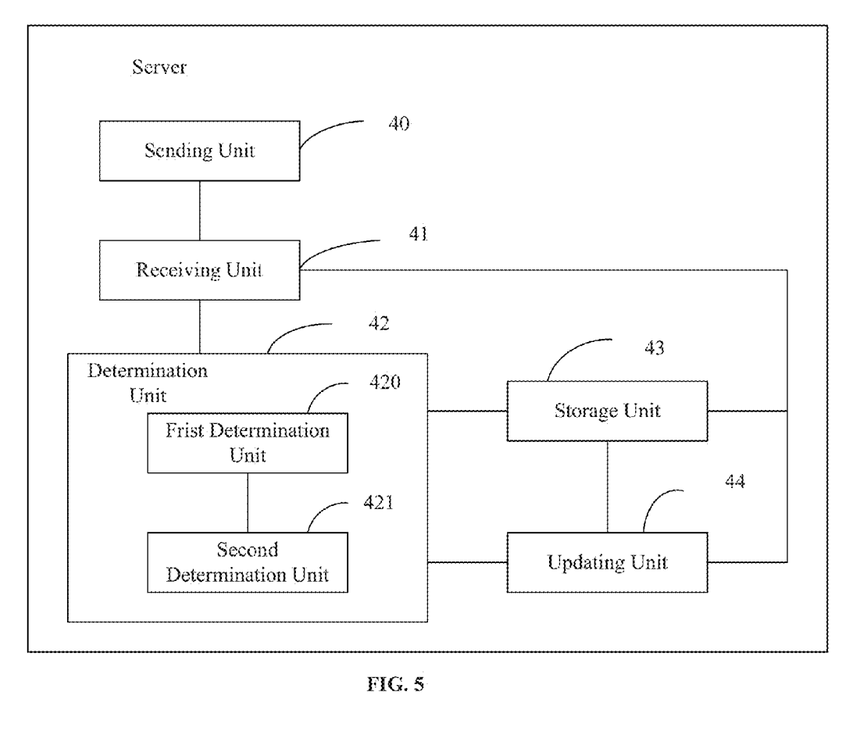
FIG. 5 illustrates a detailed structure diagram of an exemplary anti-cheating server consistent with the disclosed embodiments.

FIG. 5 illustrates a detailed structure diagram of an exemplary anti-cheating server consistent with the disclosed embodiments. As shown in FIG. 5, the server includes a sending unit 40, a receiving unit 41, a determination unit 42, a storage unit 43, and an updating unit 44. In addition, the determination unit 42 includes a first determination module 420 and a second determination module 421.

The sending unit 40 is configured to send cheating program characteristics to a client. The receiving unit 41 is configured to receive characteristics matching with cheating program characteristics reported by the client. The storage unit 43 is configured to store a real-time updated characteristic list. The characteristic list includes an abnormal characteristic list and a safe characteristic list.

The first determination module 420 is configured to determine whether the characteristics received by the receiving unit 41 are included in the abnormal characteristic list stored in the storage unit 43. The first determination module 420 matches the reported characteristics with the characteristics in the abnormal characteristic list. If the reported characteristics match with characteristics in the abnormal characteristic list, it indicates that the reported characteristics are included in the abnormal characteristic list. Then, a determination result 'no punishment' is made.

The second determination module 421 is configured to, when the first determination module determines that the reported characteristics are not included in the abnormal characteristic list, determine whether the reported characteristics are included in the safe characteristic list. The second determination module 421 matches the reported characteristics with the characteristics in the safe characteristic list. If the reported characteristics match the characteristics in the safe characteristic list, it indicates that the reported characteristics are included in the safe characteristic list. A determination result "punishment" is made.

The updating unit 42 is configured to, when the second determination module determines that the reported characteristics are not included in the safe characteristic list, update the stored characteristic list based on the number of times that the characteristics are reported in a predetermined counting time period. In the predetermined counting time period, the updating unit 44 may count the number of times that the same characteristics are reported by multiple clients. If the updating unit 44 determines that the number of times that the characteristics are reported is greater than a preset threshold value, the reported characteristics are considered as abnormal characteristics, and added into the abnormal characteristic list stored in the storage unit 43. On the other hand, if the updating unit 44 determines that the number of times that the characteristics are reported is not greater than the preset threshold value, the reported characteristics are considered as safe characteristics, and added into in the safe characteristic list stored in the storage unit 43.

The receiving unit 41 is further configured to receive characteristics re-reported by the client. The determination unit 42 is further configured to match the re-reported characteristics with characteristics in the updated characteristic list, and obtain a determination result based on the match result. Wherein, the first determination module 420 is further configured to determine whether the characteristics re-reported by the client are included in the abnormal characteristic list. If the characteristics re-reported by the client are included in the abnormal characteristic list, the determination result "no punishment" is made. The second determination module 421 is further configured to, when the first determination module 420 determines that the characteristics re-reported by the client are not included in the abnormal characteristic list, determine whether the characteristics re-reported by the client are included in the safe characteristic list. If the characteristics re-reported by the client are included in the safe characteristic list, the determination result "punishment" is made.

The sending unit 40 is further configured to send the determination result to the client, such that the client can implement the determination result.

An anti-cheating method is provided in the present disclosure. A server receives characteristics matching with cheating program characteristics reported by a client. The server matches the reported characteristics with characteristics in at least one stored characteristic list. Based on a matching result, the server obtains a determination result. The corresponding punishment operation is not performed just because the client detects that the characteristics that match the cheating program characteristics are detected. Instead, the server can further determine the characteristics matching with cheating program characteristics reported by the client, thereby improving the security of cheating program detection. In addition, the determination result is obtained by the server, reducing the number of wrong determinations caused by no real-time updated cheating program characteristics on the client. The method further enhances security and reduces risk, ultimately improving the user's experience.

Figure 6:
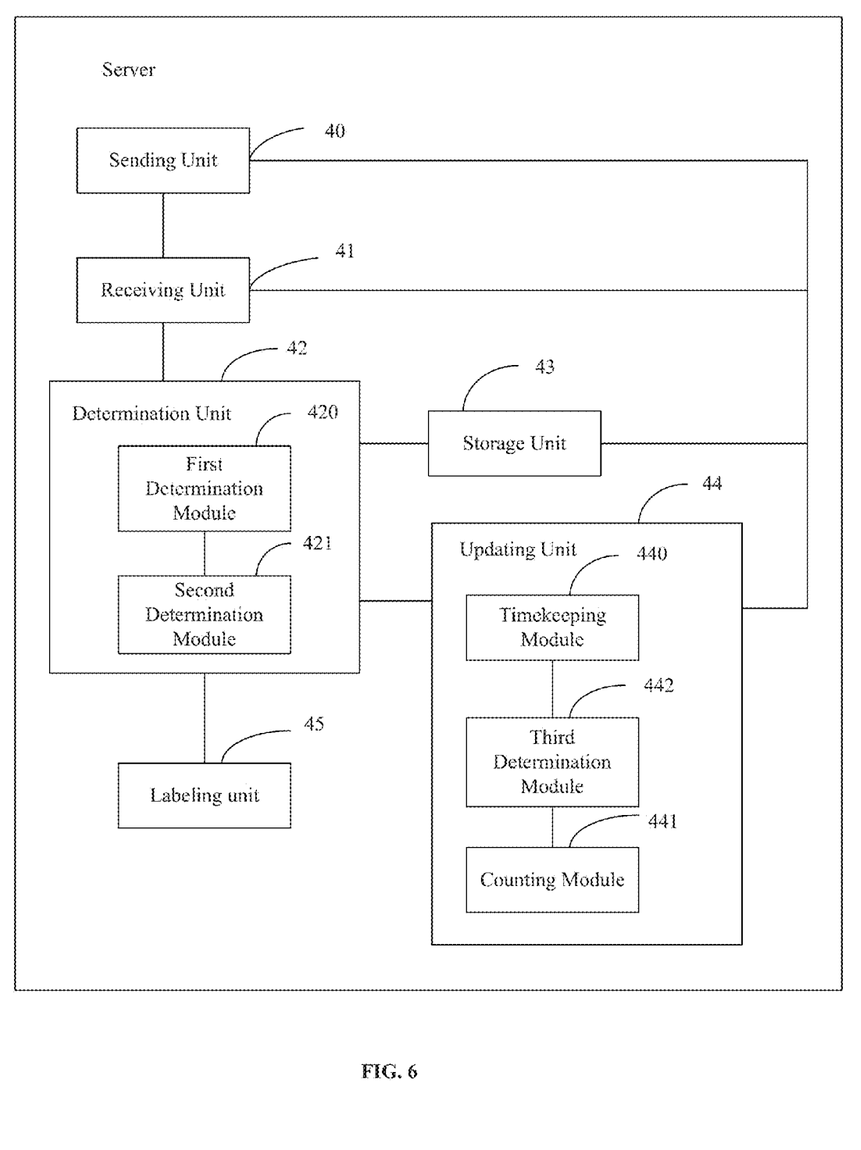
FIG. 6 illustrates a detailed structure diagram of another exemplary anti-cheating server consistent with the disclosed embodiments.

FIG. 6 illustrates a detailed structure diagram of another exemplary anti-cheating server consistent with the disclosed embodiments. As shown in FIG. 6, the server includes a sending unit 40, a receiving unit 41, a determination unit 42, a storage unit 43, and an updating unit 44. In addition, the determination unit 42 includes a first determination module 420 and a second determination module 421. The updating unit 44 includes a timekeeping module 440, a counting module 441, and a third determination module 442.

The sending unit 40 is configured to send cheating program characteristics to a client. The timekeeping module 440 is configured to, when the sending unit 40 sends the cheating program characteristics to the client, start timing for counting the number of times that the characteristics are reported.

The receiving unit 41 is configured to receive the characteristics matching with cheating program characteristics reported by the client. The counting module 441 is configured to count the number of times that the matched characteristics are reported by the client. The storage unit 43 is configured to store a real-time updated characteristic list. The characteristic list includes an abnormal characteristic list and a safe characteristic list.

The first determination module 420 is configured to determine whether the characteristics received by the receiving unit 41 are included in the abnormal characteristic list stored in the storage unit 43. The first determination module 420 matches the reported characteristics with the characteristics in the abnormal characteristic list. If the reported characteristics match the characteristics in the abnormal characteristic list, it indicates that the reported characteristics are included in the abnormal characteristic list. Then, a determination result "no punishment" is made.

The second determination module 421 is configured to, when the first determination module 420 determines that the reported characteristics are not included in the abnormal characteristic list, determine whether the reported characteristics are included in the safe characteristic list. The second determination module 421 matches the reported characteristics with the characteristics in the safe characteristic list. If the reported characteristics match the characteristics in the safe characteristic list, it indicates that the reported characteristics are included in the safe characteristic list. A determination result "punishment" is made.

The third determination module 442 is configured to, when the second determination module determines that the reported characteristics are not included in the safe characteristic list, after the counting time period of the timekeeping module 440 is ended, determine whether the number of times that the characteristics are reported is greater than a preset threshold value, and inform the updating unit 43 to update the characteristic list based on the judgment result. The third determination module 442 is further configured to, when the number of times that the characteristics are reported is greater than the preset threshold value, determine that the reported characteristics are abnormal characteristics, and inform the storage unit 43 to add the reported characteristics into the abnormal characteristic list stored in the storage unit 43. The third determination module 442 is further configured to, when the number of times that the characteristics are reported is not greater than the preset threshold value, determine that the reported characteristics are safe characteristics, and inform the storage unit 43 to add the reported characteristics into the safe characteristic list stored in the storage unit 43.

The receiving unit 41 is further configured to receive the characteristics re-reported by the client. The determination unit 42 is further configured to match the re-reported characteristics with characteristics in the updated characteristic list, and obtain a determination result based on the matching result. Wherein, the first determination module 420 is further configured to determine whether the characteristics re-reported by the client are included in the abnormal characteristic list. If the characteristics re-reported by the client are included in the abnormal characteristic list, the determination result "no punishment" is made. The second determination module 421 is further configured to, when the first determination module 420 determines that the characteristics re-reported by the client are not included in the abnormal characteristic list, determine whether the characteristics re-reported by the client are included in the safe characteristic list. If the characteristics re-reported by the client are included in the safe characteristic list, the determination result "punishment" is made.

The second determination module 421 is further configured to, when the characteristics re-reported by the client are not included in the safe characteristic list, determine to punish the player and inform the storage unit 43 to add the characteristics re-reported by the client into the safe characteristic list.

The sending unit 40 is further configured to return the determination result to the client, such that the client can implement the determination result.

Optionally, the server also includes a labeling unit 45. The labeling unit 45 is configured to, when the second determination module 421 determines that the characteristics reported by the client are not included in the safe characteristic list, label the client's status as a delay determination status.

After the counting time period of the timekeeping module 440 is ended, the server determines whether there is a delay determination status label in the labeling unit 45. When the delay determination status label exists, the first determination module 420 and the second determination module 421 further determine whether or not to punish the client.

An online game anti-cheating method is provided in the present disclosure. A server receives characteristics matching with cheating program characteristics reported by a client. The server matches the reported characteristics with characteristics in at least one stored characteristic list. Based on a matching result, the server obtains a determination result. The corresponding punishment operation is not performed just because the clients detects that the characteristics that match the cheating program characteristics are detected. Instead, the server can further determine the characteristics matching with cheating program characteristics reported by the client, thereby improving the security of cheating program detection. In addition, the determination result is obtained by the server, reducing the number of wrong determinations caused by no real-time updated cheating program characteristics on the client. The method further enhances security and reduces risk, ultimately improving the user's experience.

Figure 7:
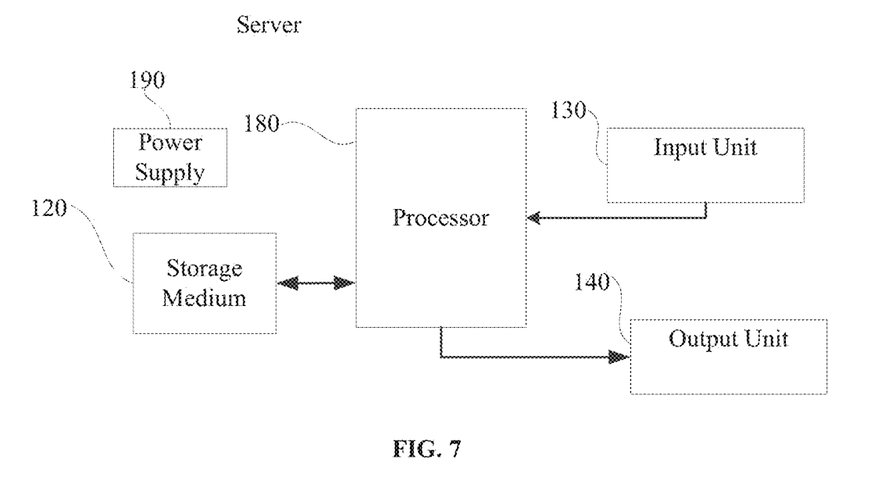
FIG. 7 illustrates a schematic diagram of an exemplary anti-cheating server consistent with the disclosed embodiments.

FIG. 7 illustrates a schematic diagram of an exemplary anti-cheating server consistent with the disclosed embodiment. As shown in FIG. 7, the server may include a storage medium 120, an input unit 130, an output unit 140, a processor 180, and a power supply 190. Certain devices may be omitted and other devices may be included.

Processor 180 may include any appropriate processor or processors that may accept instruction and data as input, process it according to instructions stored in its memory, and provide results as output. Further, processor 180 can include multiple cores for multi-thread or parallel processing. Storage medium 120 may include any appropriate memory modules used to store programs (sequences of instructions) or data, such as ROM, RAM, flash memory modules, and erasable and rewritable memory, and mass storages, such as CD-ROM, U-disk, and hard disk, etc. Storage medium 120 may store computer programs or modules for implementing various processes, when executed by processor 180. Storage medium 120 may also include storage controller used to access storage medium 120 for input unit 130 and processor 180.

Further, input unit 130 may be any appropriate peripheral used to receive data and control signals (e.g. numbers, characters, etc.), such as keyboard, mouse, trackball, etc.

The server may include power supply 190 that can provide low-voltage regulated DC power for the internal components (e.g., storage medium 120, processor 180, etc.) of a computer. The power supply 190 include one or more DC or AC power, recharging system, power fail detection circuit, power supply converters or inverters, power status indicator, etc.

In the server, cheating program characteristics are sent to the client through the output unit 140. The processor 180 receives the characteristics matching with cheating program characteristics from the client through the input unit 130. The processor 180 matches the reported characteristics with characteristics stored in at least one characteristic list, and obtains a determination result based on a matching result. The determination result is sent to the client through the output unit 140, such that the client can implement the determination result.

Optionally, the characteristic list for storing characteristics in the processor 180 includes an abnormal characteristic list. The process for matching the reported characteristics with characteristics stored in the characteristic list and obtaining a determination result based on a matching result further includes the followings.

The processor 180 determines whether the reported characteristics are included in the abnormal characteristic list. If the reported characteristics match with characteristics in the abnormal characteristic list, the processor 180 determines that the reported characteristics are included in the abnormal characteristic list. A determination result "no punishment" is made.

Optionally, the characteristic list for storing characteristics in the processor 180 includes a safe characteristic list. The process for matching the reported characteristics with characteristics stored in the characteristic list and obtaining a determination result based on a matching result further includes the followings.

If the reported characteristics do not match with characteristics in the abnormal characteristic list, the processor 180 determines that the reported characteristics are not included in the abnormal characteristic list. The processor 180 determines whether the reported characteristics are included in the safe characteristic list. If the reported characteristics match with characteristics in the safe characteristic list, the processor 180 determines that the reported characteristics are included in the safe characteristic list. A determination result "punishment" is made.

Optionally, the process for matching the reported characteristics with characteristics stored in the characteristic list and obtaining a determination result based on the matching result further includes the followings.

If the reported characteristics do not match with characteristics in the safe characteristic list, the processor 180 determines that the reported characteristics are not included in the safe characteristic list. The processor 180 determines to delay the determination result. In a predetermined counting time period, the processor 180 updates the characteristic list based on the number of times that the characteristics are reported.

Optionally, the process for updating the characteristic list based on the number of times that the characteristics are reported in the predetermined counting time period further includes the followings.

The processor 180 determines whether the time period for counting the number of times that the characteristics are reported is ended. If it is determined that the counting time period is ended, the processor 180 determines whether the number of times that the characteristics are reported is greater than a preset threshold value. If it is determined that the number of times that the characteristics are reported is greater than the preset threshold value, the processor 180 determines that the reported characteristics are abnormal characteristics, and adds the reported characteristics into the abnormal characteristic list.

On the other hand, if it is determined that the number of times that the characteristics are reported is not greater than the preset threshold value, the processor 180 determines that the reported characteristics are safe characteristics, and adds the reported characteristics into the safe characteristic list.

Optionally, the input unit 130 is further configured to receive the characteristics re-reported by the client. The processor 180 matches the characteristics re-reported by the client with characteristics in the updated characteristic list, and obtains a determination result based on the matching result.

Optionally, after the determination result "delay the determination" is made, the processor 180 is further configured to label the client's status as a delay determination status.

Optionally, the processor 180 is further configured to detect whether there is a delay determination label on the client. If there is a delay determination label on the client, the processor 180 determines that the characteristics re-reported by the client are safe characteristics. The processor 180 returns a determination result "punishment" to the client through the output unit 140, and adds the characteristics re-reported by the client into the safe characteristic list.

Those skilled in the art should understand that all or part of the steps in the above method may be executed by relevant hardware instructed by a program, and the program may be stored in a computer-readable storage medium such as a read only memory, a magnetic disk, a Compact Disc (CD), and so on.

The embodiments disclosed herein are exemplary only and not limiting the scope of this disclosure. Without departing from the spirit and scope of this invention, other modifications, equivalents, or improvements to the disclosed embodiments are obvious to those skilled in the art and are intended to be encompassed within the scope of the present disclosure.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

By using the disclosed online game anti-cheating method and server, a server receives characteristics matching with cheating program characteristics reported by a client. The server matches the reported characteristics with characteristics in at least one stored characteristic list. Based on a matching result, the server obtains a determination result. The corresponding punishment operation is not performed just because implemented the clients detects that the characteristics that match the cheating program characteristics are detected. Instead, the server can further determine the characteristics matching with cheating program characteristics reported by the client, thereby improving the security of cheating program detection. In addition, the determination result is obtained by the server, reducing the number of wrong determinations caused by no real-time updated cheating program characteristics on the client. The method further enhances security and reduces risk, ultimately improving the user's experience.

What is claimed is:

1. An online game anti-cheating method, comprising:
    sending, by a server having at least a processor, cheating program characteristics to a plurality of clients, each client being a game software installed on a user terminal having at least a processor, wherein a cheating program is an automated program executed in parallel with the game software that helps a player illicitly skip steps and gain extra points in the online game;
    receiving, by the server, characteristics matching with the cheating program characteristics reported by the plurality of clients in a predetermined time period;
    during the predetermined time period, matching, by the server, the reported characteristics from each client with characteristics in at least one stored characteristic list;
    when the server finds a matching result for the reported characteristics in the at least one stored characteristic list, obtaining, by the server, a determination result for the corresponding client based on the matching result;
    when the server does not find the matching result for the reported characteristics in the at least one stored characteristic list, determining the determination result for the corresponding client as delaying determination, and recording the characteristics not found in the at least one stored characteristic list;
    returning, by the server, the determination result to the corresponding client and to cause the corresponding client to react to the determination result; and
    when the predetermined time period is ended, updating the at least one stored characteristic list based on a total number of times that the characteristics not found in the at least one stored characteristic list are reported during the predetermined time period.

2. The method according to claim 1, when the stored characteristic list includes an abnormal characteristic list, wherein matching the reported characteristics with characteristics in a stored characteristic list and obtaining a determination result based on a matching result further includes:
    determining whether the reported characteristics are included in the abnormal characteristic list, wherein the abnormal characteristic list is a list containing characteristics that are reported by the client but do not considered as the cheating program characteristics;
    when the reported characteristics match with characteristics in the abnormal characteristic list, determining that the reported characteristics are included in the abnormal characteristic list; and
    determining the determination result for the corresponding client as no punishment.

3. The method according to claim 2, when the stored characteristic list includes a safe characteristic list, wherein matching the reported characteristics with characteristics in a stored characteristic list and obtaining a determination result based on a matching result further includes:

determining whether the reported characteristics are included in the safe characteristic list, wherein the safe characteristic list is a list containing validated cheating program characteristics;

when the reported characteristics match with characteristics in the safe characteristic list, determining that the reported characteristics are included in the safe characteristic list; and determining the determination result for the corresponding client as punishment, wherein the corresponding client reacts to the determination result by terminating the corresponding client from running the online game.

4. The method according to claim 3, wherein updating the at least one stored characteristic list based on a total number of times that the characteristics not found in the at least one stored characteristic list are reported in the predetermined time period further includes:

determining whether the number of times that the characteristics not found in the at least one stored characteristic list are reported is greater than a preset threshold value;

when the number of times is greater than the preset threshold value, determining that the reported characteristics are abnormal characteristics and adding the reported characteristics into the abnormal characteristic list; and when the number of times is not greater than the preset threshold value, determining that the reported characteristics are safe characteristics and adding the reported characteristics into the safe characteristic list.

5. The method according to claim 1, further including:

receiving the characteristics re-reported by the client, wherein when the server returns the determination result of delaying determination to the corresponding client, the corresponding client reacts to the determination result by re-reporting the characteristics after the predetermined time period is ended;

matching the re-reported characteristics with characteristics in the updated characteristic list; and obtaining a determination result based on the matching result.

6. The method according to claim 2, after determining the determination result for the corresponding client as delaying determination, further including:

labeling, by the server, the client's status as a delay determination status.

7. The method according to claim 6, further including:

detecting a delay determination label on the client;

when there is a delay determination label on the client, determining that the characteristics re-reported by the client are safe characteristics;

returning the determination result as punishment to the client; and adding the characteristics re-reported by the client into the safe characteristic list.

8. An online game anti-cheating server comprising at least a processor and a plurality of program units to be executed by the processor, the plurality of program units comprising:

a sending unit configured to send cheating program characteristics to a plurality of clients, each client being a game software installed on a user terminal having at least a processor, wherein a cheating program is an automated program executed in parallel with the game software that helps a player illicitly skip steps and gain extra points in the game;

a receiving unit configured to receive characteristics matching with the cheating program characteristics reported by the plurality of clients in a predetermined time period;

a storage unit configured to store at least one characteristic list;

a determination unit configured to:

match the reported characteristics from each client with the at least one characteristics in the characteristic list stored in the storage unit;

when a matching result for the reported characteristics in the at least one stored characteristic list is found, obtain a determination result for the corresponding client based on the matching result; and when the matching result for the reported characteristics in the at least one stored characteristic list is not found, determine the determination result for the corresponding client as delaying determination, and record the characteristics not found in the at least one stored characteristic list;

the sending unit further configured to return the determination result to the corresponding client and to cause the corresponding client to react to the determination result during the predetermined time period; and an updating unit configured to, when the predetermined time period is ended, update the at least one stored characteristic list based on a total number of times that the characteristics not found in the at least one stored characteristic list are reported during the predetermined time period.

9. The server according to claim 8, wherein:

the stored characteristic list includes an abnormal characteristic list, wherein the abnormal characteristic list is a list containing characteristics that are reported by the client but do not considered as the cheating program characteristics; and the determination unit includes a first determination module configured to:

determine whether the reported characteristics are included in the abnormal characteristic list;

when the reported characteristics match characteristics in the abnormal characteristic list, determine that the reported characteristics are included in the abnormal characteristic list; and determine the determination result for the corresponding client as no punishment.

10. The server according to claim 9, wherein:

the stored characteristic list includes a safe characteristic list, wherein the safe characteristic list is a list containing validated cheating program characteristics; and the determination unit includes a second determination module configured to:

determine whether the reported characteristics are included in the safe characteristic list;

when the reported characteristics match characteristics in the safe characteristic list, determine that the reported characteristics are included in the safe characteristic list; and determine the determination result for the corresponding client as executing punishment, wherein the corresponding client reacts to the determination result by terminating the corresponding client from running the online game.

11. The server according to claim 8, wherein the updating unit further includes:

a counting module configured to count the number of times that the characteristics not found in the at least one stored characteristic list reported by the plurality of clients in the predetermined time period; and a third determination module configured to:

when the predetermined timing period for counting the reported characteristics is ended, determine whether the number of times that the characteristics not found in the at least one stored characteristic list are reported is greater than a preset threshold value.

12. The server according to claim 7, wherein the third determination module is further configured to:

when the number of times is greater than the preset threshold value, determine that the reported characteristics are abnormal characteristics and inform the storage unit to add the reported characteristics into the abnormal characteristic list stored in the storage unit; and when the number of times is not greater than the preset threshold value, determine that the reported characteristics are safe characteristics and inform the storage unit to add the reported characteristics into the safe characteristic list stored in the storage unit.

13. The server according to claim 10, further including:

a labeling unit configured to, when the second determination module determines that the reported characteristics are not included in the safe characteristic list, label the client's status as a delay determination status, wherein the second determination module is further configured to:

detect the delay determination label on the client; when the delay determination label on the client is detected, determine that the characteristics re-reported by the client are safe characteristics; and inform the storage unit to add the characteristics re-reported by the client into the safe characteristic list.

14. The method according to claim 1, wherein:

the determination result returned by the server includes one of: punishment for clients running the cheating program, no punishment for clients not running the cheating program, and delaying determination for clients having characteristics not found in the stored the at least one stored characteristic list; and when the server returns the determination result of delaying determination to the corresponding client, the corresponding client reacts to the determination result by re-reporting the characteristics after the predetermined time period is ended.

* * * * *